United States Patent [19]
States

[11] Patent Number: 5,263,817
[45] Date of Patent: Nov. 23, 1993

[54] APPARATUS FOR PELLETIZING COARSELY GROUND PARTICULATE FEED MATERIAL

[75] Inventor: Robert C. States, Corte Madera, Calif.

[73] Assignee: California Pellet Mill Company, San Francisco, Calif.

[21] Appl. No.: 973,246

[22] Filed: Nov. 9, 1992

Related U.S. Application Data

[63] Continuation of Ser. No. 709,195, Jun. 3, 1991, abandoned.

[51] Int. Cl.$^5$ .............................................. B29C 31/00
[52] U.S. Cl. ................................. 425/331; 34/57 R; 34/168; 425/DIG. 230
[58] Field of Search ............... 34/57 R, 168, 181, 236; 425/328, 331, 143, 144, 362, DIG. 230

[56] References Cited

U.S. PATENT DOCUMENTS

| | | | |
|---|---|---|---|
| 2,934,434 | 4/1960 | Hartman et al. | 34/181 |
| 3,191,227 | 6/1965 | Keefe | 425/331 |
| 3,249,263 | 5/1966 | Howard | 34/181 |
| 3,695,165 | 10/1972 | Sienkiewicz et al. | 34/168 |
| 3,932,736 | 1/1976 | Zarow et al. | 425/DIG. 230 |
| 4,135,767 | 1/1979 | Hench et al. | 34/57 R |
| 4,162,881 | 7/1979 | Morse | 425/362 |
| 4,817,517 | 4/1989 | Ammann et al. | 425/378.1 |
| 4,929,163 | 5/1990 | Volk, Jr. | 425/331 |
| 4,979,887 | 12/1990 | Groebli et al. | 425/331 |

*Primary Examiner*—Charles S. Bushey
*Attorney, Agent, or Firm*—Robert F. Palermo

[57] ABSTRACT

A pelleting line incorporates a flash dryer in order to permit processing of coarsely ground particulate feed material under optimum conditions at all stages of processing. By conditioning using steam having higher than normally optimum moisture content and temperature, an increased gradient of moisture and temperature can be maintained from surface of the feed material particle to its center. The conditioning can be accomplished in approximately the same time as that required for finely ground feed material. Thus starch conversion, salmonella destruction, and shear strength adjustment are each optimized for the pellet production process. Because it permits processing of coarsely ground feed material, incorporation of the flash dryer in the pelleting line reduces grinding costs and eliminates down time of the pelleting line caused by plugging of the pelletizing mill and/or the necessity to purge the feed material conditioner.

10 Claims, 2 Drawing Sheets

APPARATUS FOR PELLETIZING COARSELY GROUND PARTICULATE FEED MATERIAL

This application is a continuation of application Ser. No. 07/709,195, filed Jun. 3, 1991 now abandoned.

BACKGROUND OF THE INVENTION

This invention relates generally to pelletizing of particulate matter and more particularly to preconditioning of animal feed materials before pelletizing.

Prior to pelletizing, animal feeds must be finely ground and exposed to a conditioning treatment. This involves heating in an environment with controlled moisture content to cause a desired degree of starch conversion and to destroy salmonella organisms in the feed. In addition, this conditioning treatment, by increasing moisture content and temperature of the feed, improves the pellet formation ability of the feed in the pelletizing die. Conditioning is normally performed in the mixer in which the feed formulation is blended. The conditioner is heated and moisture is added by means of a steam valve which is throttled to control the temperature and moisture content of the feed formulation.

A conventional feed pelletizing mill includes a mixer/conditioner, a transfer unit to convey the conditioned material to the pelletizing die, the pelletizing die, and a pellet cooling unit. The conditioner size is determined by the dwell time required by the feed material in the conditioner. Thus, material requiring a long conditioning dwell time will require a large conditioner in order to provide a adequate supply of feed material to the pelletizing die. Dwell time required is determined by the characteristics of the feed material, such as particle size, permeability to heat and moisture, heat capacity, starch content, and shear strength, and by the time, temperature and moisture required to kill microorganisms. In general, the finer the particle size, the shorter the conditioning time required.

Ideally, conditioning would be performed under temperature and moisture conditions which are optimized for the material being conditioned. This is not always possible because, if the temperature and moisture content required for conditioning o the material are greater than that which can be tolerated in the pelletizing die due to the shear strength of the feed material the conditioning parameters must be adjusted in order to avoid plugging of the pelletizing die. It is generally accepted that the shear strength of the feed material is inversely proportional to its temperature and moisture content. Thus, when temperature and moisture content become too high, the shear strength decreases to the point where the feed material plasticizes and begins to agglomerate at pressures below that necessary for pelletizing, thereby plugging the pelletizing die.

It would be desirable to avoid the cost of fine grinding of the feed materials and to only grind them sufficiently to provide proper mixing, however, the constraints imposed by the long conditioner dwell time required by coarse particles creates risks which outweigh the economic advantage of coarse grinding. Since large particles require long conditioner dwell times, a pelletizing die of a given capacity will require a larger conditioning unit. Larger conditioners not only have a higher cost, but also create operational problems. If the steam valve control is not accurate, the feed material exiting the conditioner may be overheated and contain excess moisture, thus, it may have too low a shear strength for proper pelletizing. When that happens the conditioner must be emptied and purged in order to reduce its temperature and moisture content. This requires shutdown of the pelletizing operation until the conditioner is completely emptied and purged. Such shutdowns are costly.

The foregoing illustrates limitations known to exist in present pelletizing operations. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for pelletizing coarsely ground particulate feed material comprising a feed bin having an outlet; a conditioner vessel having an inlet, for receiving feed material from the feed bin, and an outlet; means within said conditioner vessel for mixing and blending the particulate feed material; an inlet means in said conditioner vessel for adding steam to heat and moisturize the feed material above an optimum surface conditioning temperature and to an excess level of surface moisture content; an apparatus for pelletizing conditioned particulate feed material which is received through an inlet of the pelletizing apparatus; a walled duct connecting the outlet of the conditioner vessel to the inlet of the apparatus for pelletizing; and means for flash drying said feed material within said walled duct before the feed material reaches the inlet of the apparatus for pelletizing.

The foregoing and other aspects will become apparent from the following detailed description of the invention when considered in conjunction with the accompanying drawing figures.

DETAILED DESCRIPTION

Figure 1:
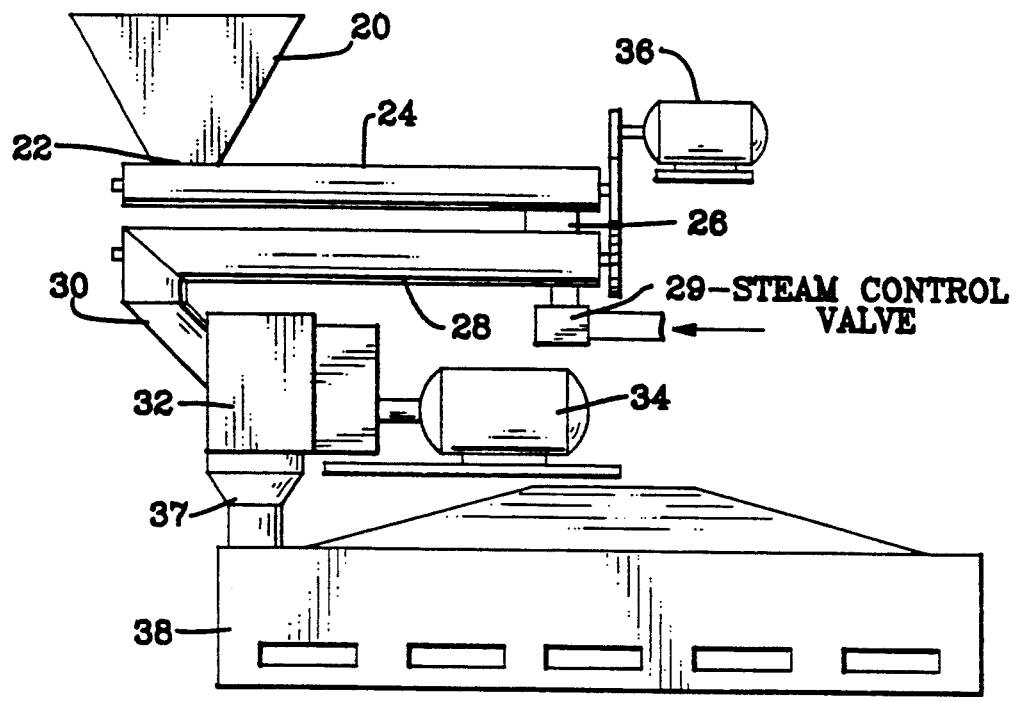
FIG. 1 is a schematic representation of a pelleting line of the prior art.

A pelleting line of the prior art is shown in FIG. 1. The preground particulate material is placed in feed bin 20 from which it is gravity fed through bin outlet 22 into the feed conveyor 24 driven by feed conveyor motor 36. From the feed conveyor outlet 26, the particulate material enters the conditioner vessel 28 where it is subjected to mixing and conditioning by injection of steam from steam valve 29 into conditioner 28. The temperature and moisture content of the particulate material is increased in the conditioner. This leads to starch conversion, salmonella destruction, and a reduction in shear strength of the particulate matter which, if not carried too far, improves pelletizing behavior. After a predetermined conditioning time, the particulate material is fed from conditioner 28 through conditioner outlet 30 into pelletizing mill 32 which is driven by drive motor 34. The material is forced through apertures in a pelletizing die (not shown) within the pelletizing mill to form compact and relatively durable pellets.

These pellets are fed through connector duct 37 into pellet cooler 38 where they are cooled prior to removal.

Dwell time in the conditioner is adjusted to achieve the desired degree of starch conversion, which depends on the feed material being pelletized; to achieve a proper degree of salmonella destruction, which also depends on the nature of the feed material; and to achieve the proper shear strength reduction for pelletizing, which is primarily determined by the particle size of the feed material. Generally, more finely ground particulate material requires a shorter conditioning time than does coarsely ground or large particle material. The longer conditioner dwell time required by coarse particles necessitates a larger conditioner in order to maintain operation of the pelletizing mill at its design capacity. The temperature and moisture content of the conditioner atmosphere interact with the particles being conditioned to form temperature and moisture gradients between the outer surfaces and the centers of the particles. The rate of conditioning, then, is ultimately determined by the thermal and moisture conductivity of the particulate material. In order to drive the conditioning reaction at a practical rate, it is necessary to operate the conditioner with an atmosphere having a temperature and moisture content which are well above the optimum temperature and moisture content for the conditioned material. This results in particles entering the pelletizing mill with surface temperatures and surface moisture contents which may be excessive, thereby producing shear strength less than that required for optimum pelletizing behavior and resulting in periodic plugging of the pelletizing die.

This problem is commonly avoided by fine grinding the particulate material to be pelletized and, thereby, maintaining a short dwell time in the conditioner and a minimal thermal and moisture gradient from the surface to the center of the particles.

Figure 2:
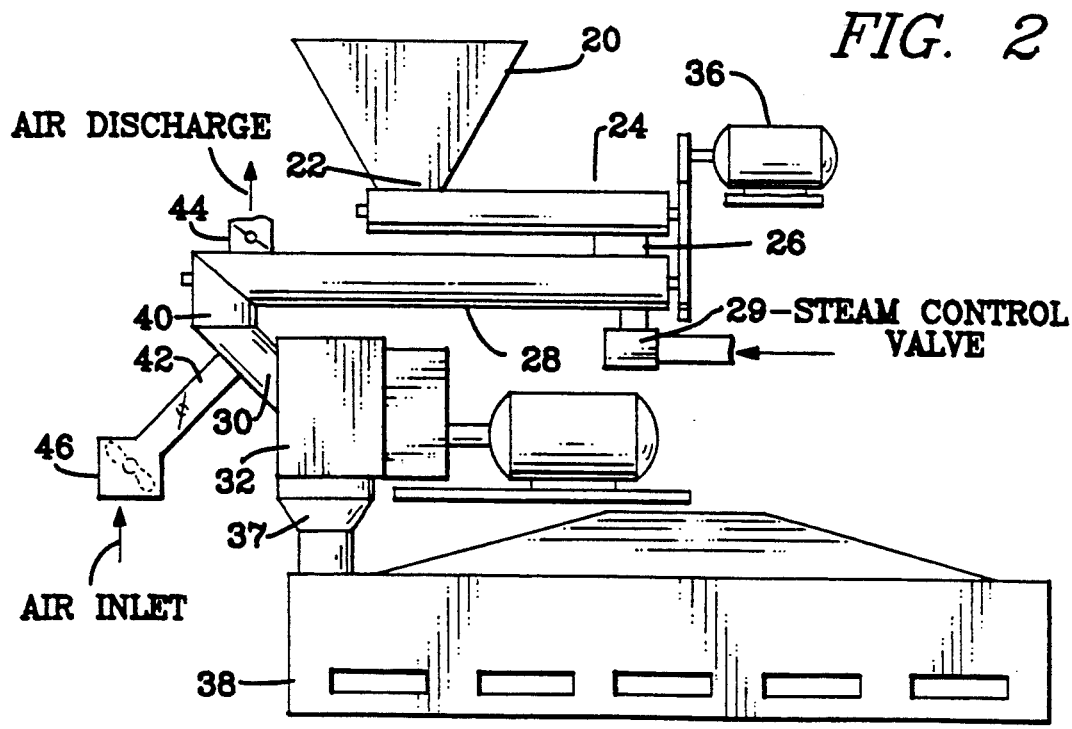
FIG. 2 is a schematic representation of a pelleting line in accordance with the present invention.

FIG. 2 shows a schematic representation of the pelleting line of the present invention. The numbering of items in this figure is identical to the numbering for the same items used in FIG. 1, because each item serves the same purpose in both embodiments pictured. The advantage of this pelleting line over those of the prior art lies in its ability to pelletize large particles while avoiding the problem of plugging of the pelletizing die. This permits a substantial saving in grinding costs while avoiding the normally encountered losses due to pelletizing die plugging and the consequent requirement to empty and completely purge the conditioner—another cause of costly down time.

In FIG. 2, the coarse particulate material is placed in feed bin 20 from which it feeds through bin outlet 22 into feed conveyor 24 driven by feed motor 36. From conveyor 24 the material discharges through outlet 26 into conditioner 28 where it is mixed and subjected to the increased temperature and moisture content caused by introduction of steam through steam valve 29. Upon completion of the appropriate dwell time within the conditioner, the particulate material, having excess moisture at its surface and excess temperature at its surface, falls through flash dryer 40 where it is exposed to a countercurrent of relatively cool dry air provided by blower 46 through air inlet 42. This dryer can also use heated air, if required. This causes flash evaporation of surface moisture which is carried away through air outlet 44, and which is accompanied by an attendant temperature reduction at the surface. The central, properly conditioned, portion of the particles is not affected by this flash drying because diffusion of both moisture and temperature from the center of the particles is slow enough that it cannot occur during the rapid flash drying operation. From flash dryer 40 the particles pass through outlet 30 and enter pelletizing mill 32 where they are pelletized in the pelletizing die without any plugging problem. After forming, the pellets, as in FIG. 1, are fed through connector duct 37 into the pellet cooler 38 where they are cooled prior to removal.

Figure 3:
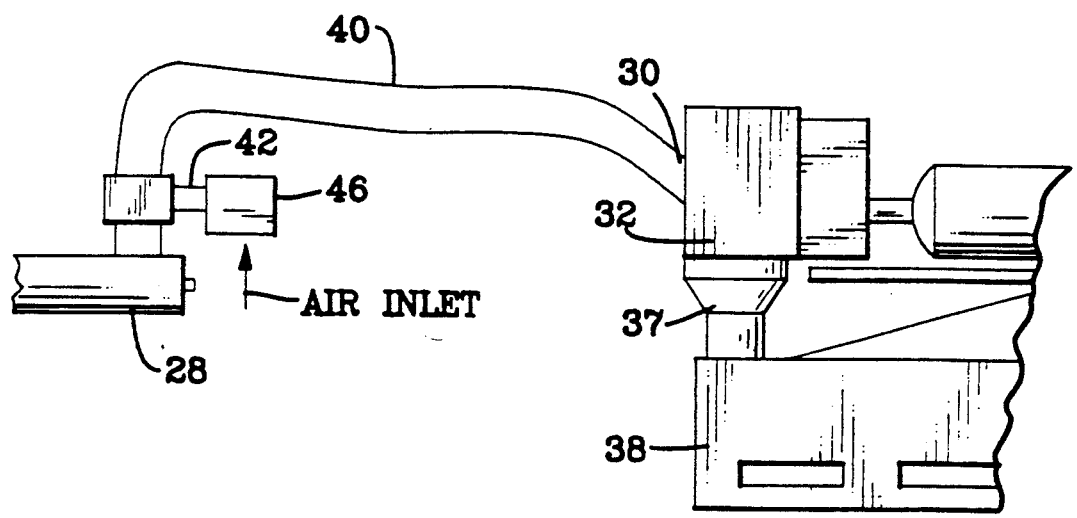
FIG. 3 is a fragmentary schematic illustration of a alternative embodiment of the flash dryer of the present invention.

In one alternative embodiment, shown in FIG. 3, feed particles from conditioner 28 are delivered to the pelletizer 32 by an air conveyor in which the air serves the dual purpose of transporting and flash drying the conditioned feed particles. The use of an air conveying system permits flexibility in the placement of the conditioner 28 and the pelletizer 32 since the pelletizer is no longer required to be below the conditioner outlet.

This invention provides advantages over the prior art including the ability to pelletize coarse particles and thereby to save grinding costs; the ability to condition particulate material prior to pelletizing according to the requirements of starch conversion, salmonella destruction, and particle shear strength; and the ability to adjust the particle surface temperature and moisture content prior to introduction into the pelletizing mill so that all stages of the pelleting operation can be optimized. In the past, operation of a pelleting line required balancing of often competing requirements of proper feed conditioning and proper pelletizing behavior. This invention has allowed the conditioning process and the pelletizing process to be optimized independently of each other.

Having described the invention, what is claimed is:

1. An apparatus for pelletizing coarsely ground particulate feed material comprising:
   a feed bin having an outlet;
   a conditioner vessel having an inlet, for receiving feed material from the feed bin, and an outlet;
   means within said conditioner vessel for mixing and blending the particulate feed material;
   an inlet means in said conditioner vessel for adding steam to heat and moisturize the feed material above an accepted surface conditioning temperature and to an excess level of surface moisture content;
   a walled duct connecting the outlet of the conditioner vessel to the inlet of the apparatus for pelletizing;
   means for flash drying said coarsely ground particulate feed material within said walled duct before said feed material reaches the pelletizing apparatus; and
   an apparatus for pelletizing conditioned particulate feed material which is received through an inlet of the pelletizing apparatus.

2. The apparatus of claim 1, wherein the means for flash drying comprises:
   inlet and outlet air passages through the walls of the walled duct, said passages providing means for directing air flow through said particulate feed material as said particulate feed material travels through the walled duct to the apparatus for pelletizing.

3. The apparatus of claim 2, wherein the means for flash drying simultaneously conveys and flash dries the conditioned particulate feed material as said particulate feed material travels from the outlet of the conditioner vessel to the inlet of the means for pelletizing.

4. In an apparatus for pelletizing coarsely ground particulate feed material; said apparatus having a feed bin, a mixing and conditioning chamber, and a pelletizing mill, the improvement comprising:

means for heating and moisturizing surface portions of said coarsely ground particulate material above an optimum level in said mixing and conditioning chamber; and means for flash drying mixed and conditioned particulate feed material after said feed material exits said conditioning chamber and before said feed material enters said pelletizing mill.

5. The improvement according to claim 4, wherein the means for flash drying the mixed and conditioned coarsely ground particulate feed material comprises:

a walled duct extending from an outlet of the mixing and conditioning chamber to an inlet of the pelletizing mill;

an air inlet and an air outlet through the walls of said walled duct; and means for causing a current of air through the particulate feed material as said coarsely ground particulate feed material travels through said walled duct.

6. The improvement according to claim 4, wherein the means for flash drying the conditioned coarsely ground particulate feed material comprises:

an air conveyor which simultaneously flash dries the particulate feed material and transports said feed material from said mixing and conditioning chamber to said pelletizing mill.

7. In a pelleting apparatus for coarsely ground particulate feed material; said apparatus having a feed bin, a feed conditioner, and a pelletizing mill, the improvement in combination with said pelleting apparatus, comprising:

means for heating and for moisturizing surface portions of said coarsely ground particulate material above an optimum level in said feed conditioner; and means for optimizing by decreasing surface temperature and surface moisture content of said coarsely ground particulate feed material after discharge of said feed material from the feed conditioner and before entry of said feed material into said pelletizing mill.

8. The improvement of claim 7, wherein the means for optimizing surface temperature and surface moisture content comprises a walled duct connecting an outlet of said feed conditioner to an inlet of said pelletizing mill, air inlet and air discharge passages through walls of said walled duct, and means for forcing a flow of air from said air inlet passage, through said walled duct, and out through said air discharge passage.

9. The improvement of claim 8, wherein said air inlet passage and said air discharge passage are located in said walled duct such as to produce a countercurrent flow of air relative to travel direction of said feed material within said walled duct.

10. The improvement of claim 7, wherein the means for optimizing surface temperature and surface moisture content comprises a walled duct connecting an outlet of said feed conditioner to an inlet of said pelletizing mill; an air inlet passage through a wall of said walled duct; and means for forcing a flow of air from said air inlet, through said walled duct, to said pelletizing mill and for thereby conveying said feed material into said pelletizing mill.

* * * * *